United States Patent [19]

Puerzer et al.

[11] Patent Number: 4,858,112
[45] Date of Patent: Aug. 15, 1989

[54] INTERFACE COMPRISING MESSAGE AND PROTOCOL PROCESSORS FOR INTERFACING DIGITAL DATA WITH A BUS NETWORK

[75] Inventors: Bernard G. Puerzer, Milwaukee; Royal R. Morse, III, Wales, both of Wis.

[73] Assignee: General Electric Company

[21] Appl. No.: 809,893

[22] Filed: Dec. 17, 1985

[51] Int. Cl.[4] .......... G06F 3/00; G06F 9/28; G06F 13/12; G06F 15/16
[52] U.S. Cl. .......... 364/200; 370/85; 370/16; 364/239; 364/239.7; 364/228; 364/242.5; 364/243.3
[58] Field of Search ... 364/200 MS File, 900 MS File; 370/85, 100, 60, 86

[56] References Cited

U.S. PATENT DOCUMENTS

| | | | |
|---|---|---|---|
| 4,016,541 | 4/1977 | Delagi et al. | 364/200 |
| 4,241,398 | 12/1980 | Carll | 364/200 |
| 4,387,425 | 6/1983 | El-Gohary | 364/200 |
| 4,393,461 | 7/1983 | Holtey et al. | 364/900 |
| 4,425,664 | 1/1984 | Sherman et al. | 364/200 |
| 4,493,021 | 1/1985 | Agrawal et al. | 364/200 |
| 4,510,594 | 4/1985 | Johnson, Jr. | 370/60 |
| 4,604,683 | 8/1986 | Russ et al. | 364/200 |
| 4,675,865 | 6/1987 | DeVries et al. | 370/85 |
| 4,692,918 | 9/1987 | Elliott et al. | 370/85 |

Primary Examiner—Raulfe B. Zache
Assistant Examiner—Emily Y. Chan
Attorney, Agent, or Firm—Thomas R. Morrison

[57] ABSTRACT

A network interface equipment for a bus network employs separate processors and random-access memories for handling bus-protocol and data portions of a data packet. Each processor has access to a separate random-access memory to and from which it moves data. The random-access memories are multiple-ported to permit access by more than one requester with a logic arbitrator to resolve conflicts. A status random-access memory provides communication between the two processors.

4 Claims, 3 Drawing Sheets

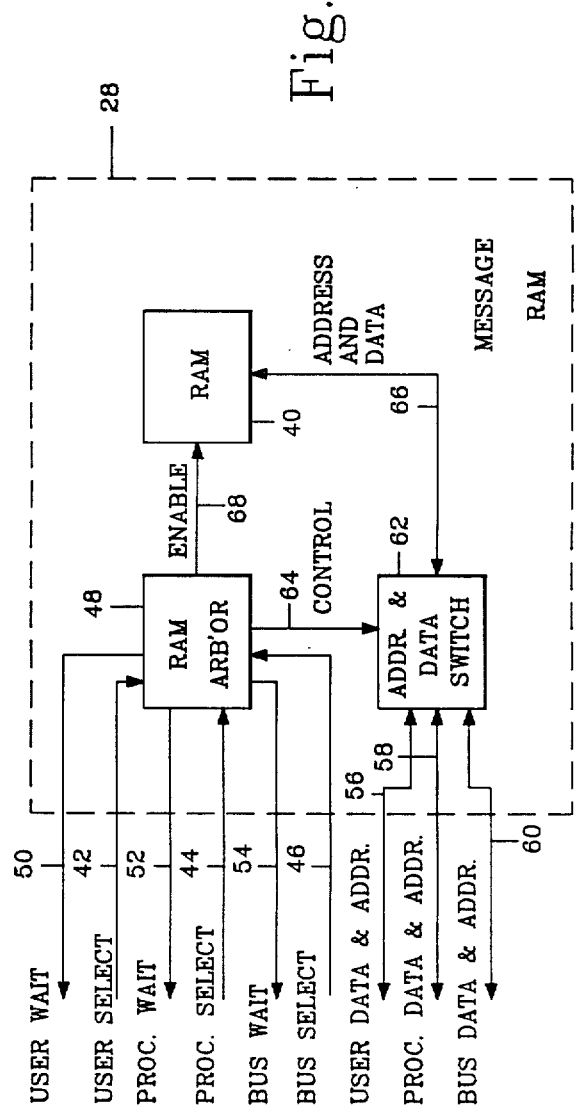

INTERFACE COMPRISING MESSAGE AND PROTOCOL PROCESSORS FOR INTERFACING DIGITAL DATA WITH A BUS NETWORK

BACKGROUND OF THE INVENTION

The present invention relates to digital data transmission and, more particularly, to interface equipment between a digital data bus and user equipment.

A distributed digital data system consists of a plurality of locations capable of communicating with each other over a suitable communications system. Each location, called a node, may receive, transmit, or both. A node may be, for example, a stand-alone personal computer with autonomous computing capability, a dumb terminal without autonomous computing capability, a printer, a communications link, or a gateway to a different network.

Three general classes of networks are in common use:
star,
ring,
bus.

In a star network, each node is directly connected by a dedicated cable radiating outward from a network server. Such a network requires large amounts of cabling to make the required interconnections. In addition, the network server is typically at least a smart terminal whose total performance is sacrificed to the needs of the network. Since a star network provides dedicated links for each node, the problem of interference between nodes attempting simultaneous access to a shared communication asset does not arise.

A ring network, as its name implies, connects adjacent nodes into a closed ring. A message originating in one node is passed on interconnecting cable to its adjacent node. If the message is addressed to the adjacent node, the adjacent node detects this fact and acts to receive it. If the message is not addressed to the adjacent node, it is passed on to the next node in the ring until the addressee node is found. Upon reception, the receiving node may place an acknowledgement message on the cable addressed to the node originating the message to confirm receipt. The acknowledgement message progresses from node to node until it is received at the original destination. The unidirectional data flow in a ring network tends to limit the data rate. In addition, since each node is responsible for passing unaccepted messages to its neighbor, failure of one node can interrupt the entire network.

A bus is a linear network consisting of a twisted-pair or coaxial link to which nodes are attached at convenient locations. All nodes apply messages to the bus and monitor the bus for messages addressed to them. Failure of one node normally cannot halt network operation. The linear nature of the bus avoids the cabling costs of the star network. Most common busses carry serial data at data rates varying from a few kilobits per second to hundreds of megabits per second.

A bus network, to which the present invention is addressed, must provide means for directing data between any two specific nodes and for dealing with the problem of two or more nodes demanding access to the bus at the same time. For present purposes, the following description is directed to an embodiment of the invention for use with a bus protocol described in the IEEE Network Standard 802.3. One commercial network system embodying the 802.3 standard is known as Ethernet and is available from 3 Com. The IEEE Network Standard 802.3 specifies a baseband system having a bit rate of 10 megabits per second. As will be later detailed, the actual ability of such a bus network to communicate intelligence is considerably lower than its bit rate.

One skilled in the art will recognize that the present invention is not limited to a particular bit rate or to a baseband system communicating on wires or coaxial cables. It is within the contemplation of the present invention to employ the techniques disclosed herein in a broadband system which may be communicated between nodes on media other than wires or coaxial cables. Broadband systems may employ a plurality of subcarriers upon each of which is imposed one data channel. Each such data channel may be considered the equivalent of an 802.3 baseband channel. Transmission media may include, for example, microwave transmission for covering at least part of the distance between nodes. Optical transmission is equally a candidate. Optical transmission may take place in air or may be constrained to optical communications media such as, for example, glass fibers. Glass fibers offer greater bandwidths which may be on the order of gigabits per second.

Bus transmission employs data packets which may be of fixed or variable length. A data packet contains a header, data and a trailer. The data in a data packet may be only part of a total message from the transmitting to the destination node. The header provides synchronizing signals, identifies the source and intended destination of the data, and includes information identifying the sequence that data in the data packet occupies with respect to data in related data packets. The trailer typically contains a cyclic-redundancy-check, or checksum, message the receiving node uses to verify that the data is received without error.

According to the Ethernet standard, a data packet has a fixed maximum length regardless of the length of the total message being transmitted. The header and trailer contain no intelligence and are therefore considered overhead to the data transmission. The ratio of overhead to data depends on the size of the header and trailer and the length of the data portion contained therein. Some systems require the ability to deal with short messages. Such systems may employ data packets having a total length of, for example, 128 bytes (eight-bit words) with a header of 44 bytes and a trailer of four bytes thus leaving 80 bytes for data. The efficiency degrades even further if the tyical message consists of less than 80 bytes. Although a relatively inefficient data transmission technique, it is optimized for short data transmission.

For longer messages, longer data packets improve the transmission efficiency. The above Ethernet system, for example, employs data packets of about 1500 bytes with a 44-byte overhead. The overhead thus becomes a relatively small percentage of the data packet.

One application of bus transmission we foresee for the present invention includes transmission of graphic data. Such graphic data typically comprises several hundred thousand to several million bytes per message. A larger data packet is therefore indicated for achieving high transmission efficiency. In a graphics data transmission system, a data packet length of about 4,000 bytes may be employed. When the data portion of the data packet is filled, the ratio of overhead to total length becomes insignificant. In the usual case, the last data packet is only partly filled. The unfilled part of the last data packet in a message is overhead. A system transmitting graphics data with a bus speed of, for example, 9.6 megabits per second may achieve a data-transmission rate on the order of about 9 megabits per second.

The equipment using bus data may be send/receive, receive-only, or send-only. A send/receive equipment may be a computer terminal. A receive-only equipment may be a graphics display or a printer. A send-only equipment may be a video camera chain, a CAT (computer axial tomography) scanner, or a magnetic resonance scanner.

Each node requires interface equipment for interfacing the user equipment with the bus data. The transmitting node performs calculations to break a long message into data packets, appends header and trailer and accesses the bus. The receiving node monitors the bus until its unique identifier is detected, accepts the data packet, calculates a cyclic redundancy check (CRC) or checksum for the data packet as well as a large number of other tests on the data packet and transmits an acknowledgement on the bus addressed to the transmitting node when requested to do so. When the calculated and received CRCs or checksums and other tests fail to agree, the receiving node scraps the data in the data packet and, in response to an acknowledgement request, places a message on the bus addressed to the transmitting node informing it of such failure. The transmitting node thereupon makes further attempts to transmit the data packet until agreement is found at the receiving node.

As noted above, all nodes have independent abilities to access the bus at any time. If two nodes transmit at the same time, data in both data packets is garbled. In a system with many nodes, a small probability exists that two nodes attempt to access the bus at the same time. The 802.3 standard avoids garble and data loss using a carrier-sense, multiple-access system with collision detection (CSMA/CD). Before transmitting, a node listens to the bus. If it detects data being transmitted on the bus, it waits until the bus is free and then begins to send. If two nodes begin transmitting at the same time, a collision results. Both transmitting nodes monitor the bus during their transmissions to detect a condition indicating the presence of more than one signal. If more than one signal is detected, both stop transmitting and remain silent for a timeout period whose length is randomly determined. The interface equipments determine the disposition of any partial data transmission up to the time of collision detection.

In some cases, the partial data transmissions are scrapped. The randomness of the timeout period guarantees that one of the nodes reaches the end of its timeout period before the other node. The earlier node listens on the bus, detects no data transmission, and begins retransmitting its prior data packet. The later node listens on the bus, detects the data transmission of the earlier node, and stands by until it detects a clear bus before beginning transmission. The time wasted during partial data transmission and the mandatory delay for both nodes reduces the effective transmission rate of the bus. When a large number of nodes are present on the bus, such reduction may become a significant fraction of the theoretical bus transmission rate.

Overhead tasks such as the assembly of data packets, testing of received data packets, and dealing with collision avoidance, place significant burdens on the interface equipment. The interface equipment conventionally performs the overhead and transmission or reception serially. That is, while transmission or reception of a data packet occurs, nothing else is done by the interface equipment. The overhead tasks may be interleaved with transmission and reception but they share memory and processor time. As a consequence, gaps occur in the transmission and reception of data to accommodate the overhead activities. We have observed that the effective transmission rate of a bus system capable of a burst transmission rate of 10 megabits per second rate may fall to less than 2 megabits per second when overhead tasks are taken into account.

OBJECTS AND SUMMARY OF THE INVENTION

Accordingly, it is an object of the invention to provide an interface equipment for a network which overcomes the drawbacks of the prior art.

It is a further object of the invention to provide an interface equipment for a bus network which processes bus protocol and message data in parallel, using separate processors. The bus protocol and data parts of the message are read out from a transmitting node in the proper order to produce a standard data packet. The bus protocol and data parts of a standard data packet are processed in separate processors to enhance the speed at which the data is accepted and acknowledged.

It is a still further object of the invention to provide a network interface equipment employing a tri-port message random-access memory capable of accepting received data at the same time that it stores the data portion of an outgoing message under the control of a message processor. In addition, a dual-port protocol random-access memory accepts received bus-protocol data at the same time that it stores the bus-protocol data of the outgoing message under control of a protocol processor.

It is a still further object of the invention to provide a status random-access memory accessible by the message processor and the protocol processor for coordinating the two processors.

It is a further object of the invention to provide an interface equipment which enables bus communication at a speed approaching the burst communication capability of the bus system.

Briefly stated, the present invention provides a network interface equipment for a bus network employing separate processors and random-access memories for handling bus-protocol and data portions of a data packet. Each processor has access to a separate random-access memory to and from which it moves data. The random-access memories are multiple-ported to permit access by more than one requester with a logic arbitrator to resolve conflicts. A status random-access memory provides communication between the two processors.

According to an embodiment of the invention, there is provided a network interface equipment for interfacing bus digital data with a user equipment, comprising: a message processor, a message random-access memory, means in the message random-access memory for servicing data requests from the bus, the message processor and from the user equipment, the message random-access memory including means effective for storing data portions of a data packet being transmitted or received, a protocol processor, a protocol random-access memory, means in the protocol random-access memory for servicing protocol requests from the bus and the protocol processor, the protocol processor being effective for producing at least a header portion of the data packet for storage in the protocol random-access memory for data packets to be transmitted and for testing correctness of received messages, and either of the message and protocol random-access memories being effective for servicing any of their respective data requests independently of the other thereof, whereby substantial parallelism of protocol and data handling is achieved.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a simplified block diagram of a message random-access memory of FIG. 2.

DETAILED DESCRIPTION OF THE PREFERRED EMBODIMENT

Figure 1:
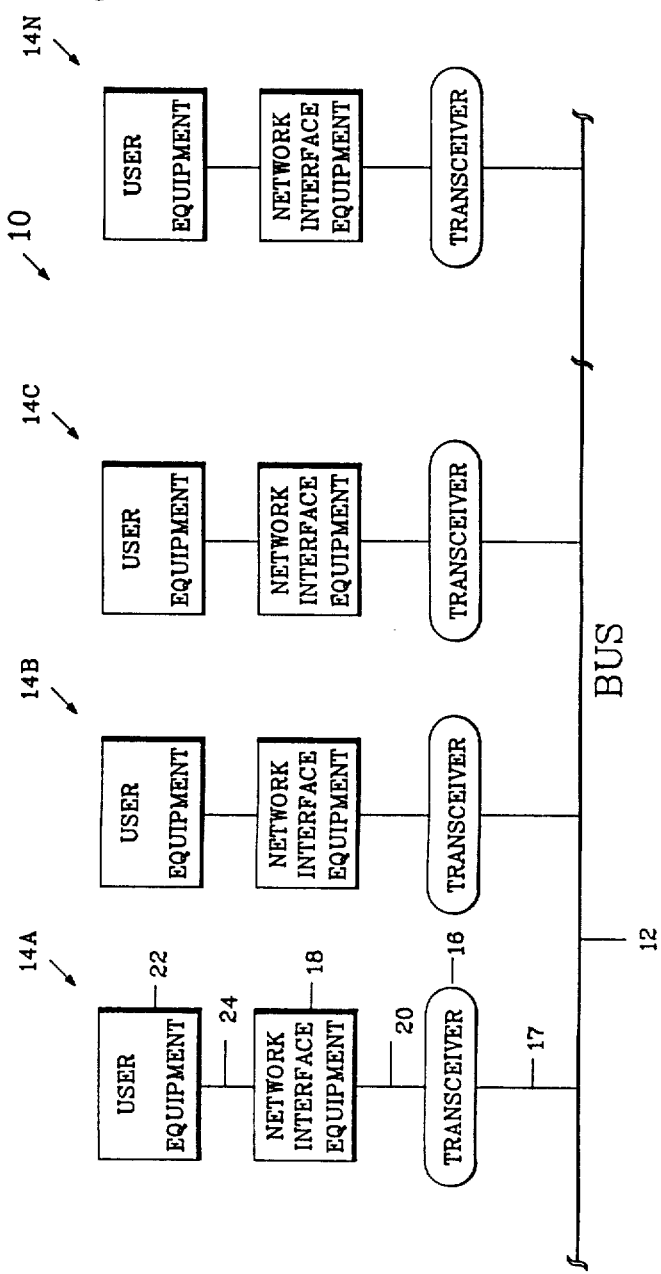
FIG. 1 is a simplified block diagram of a bus system in which the network interface equipment of the present invention may be employed.

Referring to FIG. 1, there is shown, generally at 10, a bus system to which the present invention may be applied. Bus system 10 includes a bus 12 to which a plurality of nodes 14A through 14N are attached.

Insofar as they are of interest to the present invention, all nodes 14 are identical. Thus, only node 14A is described in detail.

A conventional transceiver 16 in node 14A is connected by a data line 17 to bus 12. A network interface equipment 18 sends data to, and receives data from transceiver 16 on data lines 20. A user equipment 22, depending on its type, sends data to and/or receives data from network interface equipment 18 on data lines 24.

Data line 17 generally consists of a coaxial cable. Data line 20 consists of three sets of lines: (1) a first twisted pair for carrying data to be transmitted to transceiver 16; (2) a second twisted pair for carrying data received from bus 12; and (3) a third twisted pair for indicating that a collision is in progress on bus 12. Transceiver 16 takes care of switching between the transmitted and received sihgnals and detects collisions. If the collision detection coincides with data transmission from node 14A, then the above-enumerated steps are taken to avoid garble.

In a conventional bus system 10, data on bus 12 is Manchester coded. As is well known, a Manchester-coded signal has a 50-percent average duty ratio. If a single Manchester-coded signal is present on bus 12, the average signal voltage thereon assumes a predetermined value. However, if two Manchester-coded signals are present on bus 12, the signal voltage differs substantially from the signal voltage existing when only one signal is present. Transceiver 16 monitors the average signal voltage on bus 12 for a signal voltage indicating the presence of a collision and informs network interface equipment 18 when such a condition exists.

Transceiver 16 may be any suitable transceiver such as, for example, a conventional Ethernet transceiver available from 3 Com.

Figure 2:
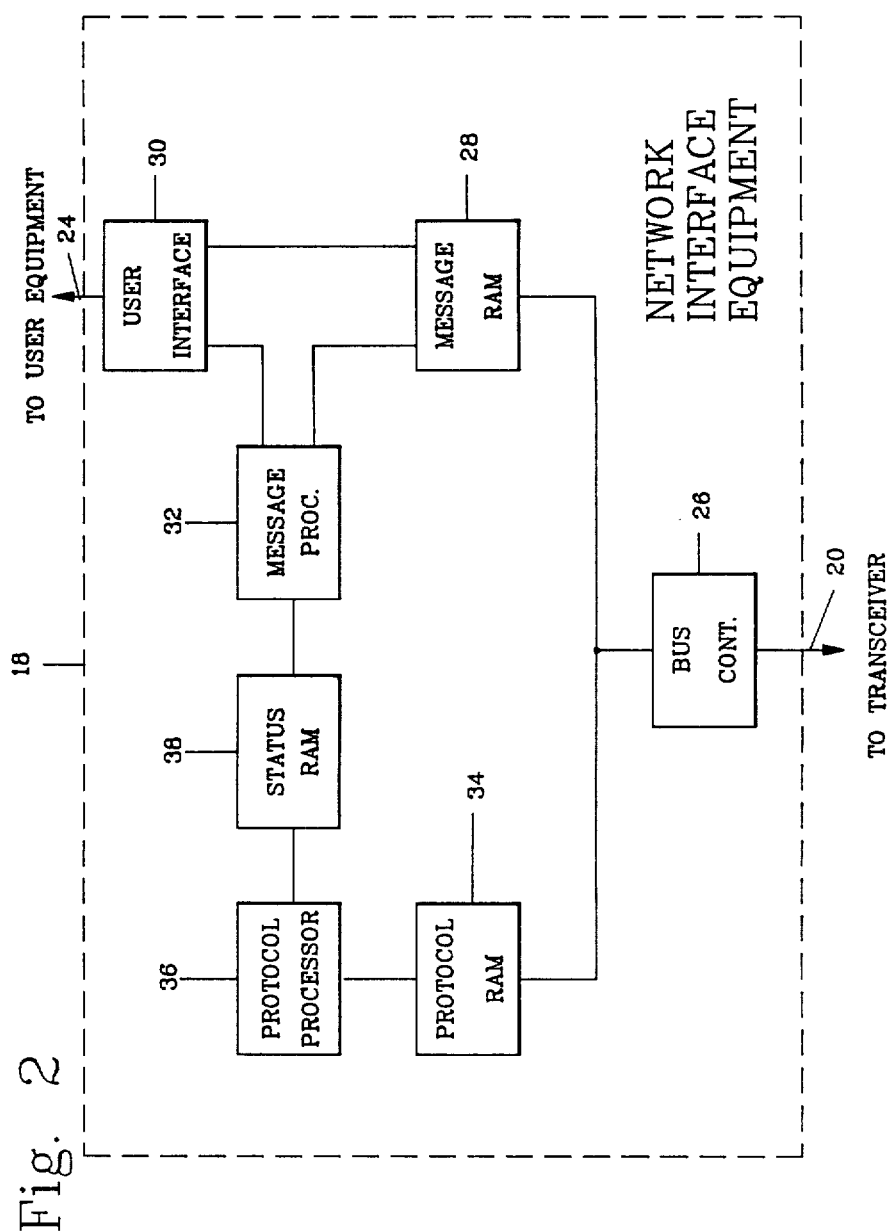
FIG. 2 is a simplified block diagram of a network interface equipment according to an embodiment of the invention.

Referring now to FIG. 2, network interface equipment 18 includes a bus controller 26 controlling the reception of data from data line 20, the transmission of data to data line 20, and the reception of a collision signal from data line 20. A message random-access memory 28 is tri-ported to permit sending or receiving the message portion of a data packet from or to bus controller 26 sending data to, or receiving data from, a user interface 30 interfacing data on data line 24 to user equipment 22 (FIG. 1). Message random-access memory 28 exchanges data with a message processor 32.

A dual-ported protocol random-access memory 34 receives the bus-protocol part of the data packet from bus controller 26 and stores the protocol portion of a data packet to be transmitted under control of a protocol processor 36. A status random-access memory 38 provides an interface between protocol processor 36 and message processor 32 as will be explained hereinafter.

In operation, to transmit data, user equipment 22 (FIG. 1) sends a command on data line 24 indicating the destination of the data to be transmitted and the size of the file. The data is then pipelined into message random-access memory 28 where it is organized by message processor 32 in data packets ready for transmission. Message processor 32 stores a message in status random-access memory 38 informing protocol processor 36 that data packets are ready for transmission, their destination, and the addresses they occupy in message random-access memory 28. Protocol processor 36 builds headers for the data packets for storage in protocol random-access memory 34.

When the collision-detection signal on data line 20 indicates that no other node is transmitting on bus 12, protocol processor 36 informs bus controller 26 to transmit a packet header from protocol random-access memory 34 and the data portion of the data packet from message random-access memory 28 onto data line 20. At the end of the data portion of the packet, the CRC or checksum trailer is added by bus controller 26 to complete the data packet.

If the collision-detection signal indicates the existence of a data collision while data is being transmitted, the above-detailed recovery procedure is initiated.

It should be noted that, during the time that message processor 32 and protocol processor 36 are engaged in preparing to transmit a data packet, time may be available during whch protocol random-access memory 34 and message random-access memory 28 may receive data from bus controller 26. Similarly, while the respective portions of data packets comprising a data message are being transmitted from protocol random-access memory 34 and message random-access memory 28, time may be available to permit these elements to receive and store the next pipelined data from user interface 30 and generate appropriate headers for transmitting the resulting data packets without delay following completion of the on-going stream of data packets. The resulting parallelism in network interface equipment 18 avoids the imposition of gaps in data transmission otherwise required for overhead activities.

To receive data, the header and, optionally, the trailer, on an incoming data packet are directed to protocol random-access memory 34 and the data portion of the data packet is directed to message random-access memory 29. Bus controller 26 performs the address verification to ensure that the data packet is addressed to its node, and prepares to perform the CRC or checksum comparison and other computations on the data portion of the data packet. The trailer may optionally be directed to message random-access memory 28 for processing by message processor 32. The data in those data packets passing the test are readied for transmission to data line 24. Protocol random-access memory 34 retains an image of the test results. If the header of the data packet contains an acknowledgement request, protocol processor 36 transmits a message containing an acknowledgement of data packets passing the test and indicates those failing the test. The transmitting node then retransmits previously failed data packets which, after successful testing, are stored in appropriate addresses in message random-access memory 28.

The above steps in receiving a data message in message random-access memory 28 and processing the received bus protocol in protocol random-access memory 34 may be performed according to predetermined priorities at the same time that a new outgoing message is being stored in message random-access memory 28 and its headers generated in protocol processor 36 for storage in protocol random-access memory 34 or a previously received message is being transmitted from message random-access memory 28 to dat line 24. Thus, a continuous receiving operation, or a continuous mixed receiving and transmitting operation, is performed with sufficient parallelism to avoid gaps in the stream of data packets on the bus.

Referring now to FIG. 3, message random-access memory 28 contains a random-access memory 40 whose services are requested by competing user, processor, and bus select signals on lines 42, 44 and 46, respectively, applied to inputs of a RAM arbitrator 48. RAM arbitrator 48 contains combinational logic consisting of, for example, conventional gates capable of deciding priority among simultaneous demands for data to or from random-access memory 40. A demand which cannot be satisfied due to higher-priority activities is delayed by the generation of a user, processor, or bus wait signal on a wait line 50, 52, or 54 respectively.

User, processor, and bus data and address information are applied on lines 56, 58 and 60 to a data and address switch 62. A control line 64 from RAM arbitrator 48 determines which data and address lines are connected between input and output of data and address switch 62. The selected address information is connected on data and address lines 66 to random-access memory 40 and the data is connected on data and address lines 66 to or from random-access memory 40. An enable signal is connected from RAM arbitrator 48 to random-access memory 40 on an enable line 68.

In operation, if only a single select signal appears on one of lines 42, 44 and 46, RAM arbitrator 48 applies a suitable control signal to data and address switch 62 for enabling connection of the information on the address and data lines of the requesting element through data and address switch 62 and supplies an enable signal to random-access memory 40 for reading or writing the data in the addresses indicated. If two select signals should appear simultaneously, logic circuits in RAM arbitrator 48 determine which of the two elements demanding access to random-access memory 40 has priority and generates a wait signal for holding off the lower-priority competitor. A control signal on control line 64 enables access by the higher-priority competitor.

A select signal arriving while random-access memory 40 is being accessed by another element may be handled in one of two ways. If the new select signal is assigned absolute priority, then RAM access may be immediately assigned to the new requester. Such a technique requires a substantial amount of data shuffling to avoid pollution of data in random-access memory 40. In the preferred embodiment, once an element has captured random-access memory 40, it is permitted to complete its read or write operation even though a higher-priority select signal is received while it is doing so. The later select signals are answered by a wait signal to hold off the later requester until the current operation is completed.

Message random-access memory 28 may be realized using any convenient hardware. In the preferred embodiment, random-access memory 40 is an array made up of a plurality of Texas Instrument type 4256 EC4 dynamic random-access memory chips. In one embodiment, two banks of 16 64-kilobit chips are employed in parallel to provide a storage capacity of 128 thousand 16-bit words. In another embodiment, four banks of 16 256-kilobit chips are employed in parallel for one million 16-bit words of storage capacity. RAM arbitrator 48 and data and address switch 62 employ conventional gate circuits which may be realized in any conventional hardware such as, for example, discrete components or integrated circuits. In the preferred embodiment, integrated circuits are preferred and, in the most preferred embodiment, suitably interconnected programmable array logic (PAL) is employed.

Referring again also to FIG. 2, protocol random-access memory 34 and status random-access memory 38 are similar to message random-access memory 28 except that they require access by only two requesters rather than the three required by message random-access memory 28. In addition, they require a smaller data storage space and their random-access memories preferably have a capacity of 16-kilobytes such as, for example, provided by Hitachi 6264 dynamic random access chips. A block diagram of protocol random-access memory 34, for example, is identical to that of message random-access memory 28 in FIG. 3, if lines 42, 50, and 56 labelled USER are deleted. The functions of protocol random-access memory 34 and status random-access memory 38 are identical to those of message random-access memory 28 and further description thereof would be redundant and is therefore omitted.

The remaining elements in network interface equipment 18 may be realized in any suitable hardware either existing now or later developed. For purposes of concreteness, the preferred embodiment implements protocol processor 36 and message processor 32 using microprocessors and, in the most preferred embodiment, using Intel 80186 microprocessors which are commercially available at the time of filing of the present application. User interface 30 may optionally contain a conventional direct-memory-access circuit for receiving and transmitting data between the user and the remainder of network interface equipment 18. User interface 30 adheres to the proposed standard for 16-bit parallel interfaces published in the ACR/NEMA Standard Interface Document. Because it adheres to such published standard, and any suitable hardware may be employed to implement it, further disclosure herein is unnecessary.

Bus controller 26 is preferably a conventional bus controller such as, for example, an Intel 82586.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A network interface equipment for interfacing digital data on a bus with a user equipment, comprising:
   a message processor;
   a message random-access memory;
   means in said message random-access memory for responding to data requests from said bus, said message processor and from said user equipment;
   said message random-access memory including means for storing data portions of a data packet being transmitted or received;
   a protocol processor;
   a protocol random-access memory;
   means in said protocol random-access memory for responding to protocol requests from said bus and said protocol processor;
   said protocol processor including means for producing at least a header portion of said packet for storage in said protocol random-access memory for data packets to be transmitted and for testing correctness of received messages; and
   said message random-access memory and said protocol random-access memory including means for responding to any of their respective data requests independently of the other.

2. A network interface equipment according to claim 1 further comprising a status random-access memory providing communication between said message processor and said protocol processor.

3. A network interface equipment according to claim 1 wherein said message random-access memory includes logic means for permitting a response to an earlier data request to said message random-access memory and for generating a wait signal in response to a later data request.

4. A network interface equipment according to claim 3 wherein said logic means includes means for selecting a one of two simultaneous requests according to a priority rule.

* * * * *

UNITED STATES PATENT AND TRADEMARK OFFICE
CERTIFICATE OF CORRECTION

PATENT NO. : 4,858,112
DATED : Aug. 15, 1989
INVENTOR(S) : Bernard G. Puerzer and Royal R. Morse, III.

It is certified that error appears in the above-identified patent and that said Letters Patent is hereby corrected as shown below:

Col. 2, line 50, change "tyical" to --typical--.

Col. 4, line 25, delete "standard" and substitute therefor --received--.

Col. 6, line 66, change "29" to --28--.

Col. 7, line 24, change "dat" to --data--.

Col. 9, line 22, after "said" insert --data--.

Signed and Sealed this

Sixth Day of August, 1991

*Attest:*

HARRY F. MANBECK, JR.

*Attesting Officer*      *Commissioner of Patents and Trademarks*